July 13, 1954     E. L. SHARP     2,683,325
LINE BUOY
Filed June 5, 1953
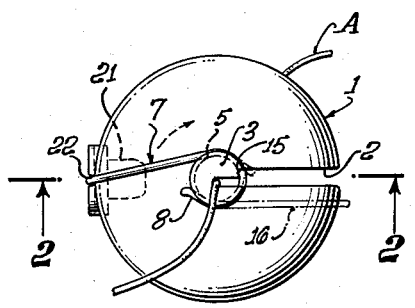
FIG. 1.
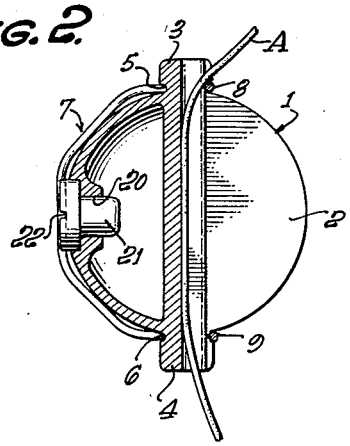
FIG. 2.
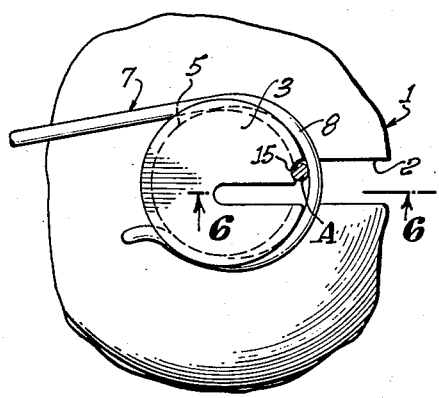
FIG. 3.
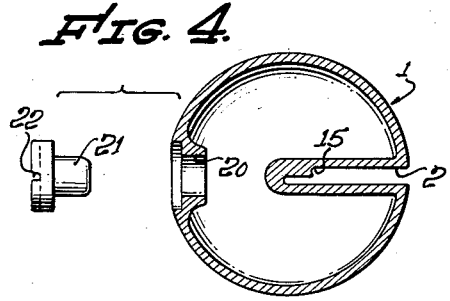
FIG. 4.
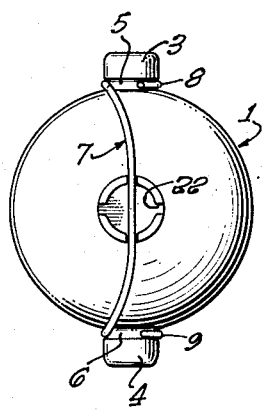
FIG. 5.
FIG. 6.
EWING L. SHARP,
INVENTOR,
BY O. O. Martin
ATTORNEY.

Patented July 13, 1954

2,683,325

UNITED STATES PATENT OFFICE 2,683,325

LINE BUOY

Ewing L. Sharp, Beverly Hills, Calif.

Application June 5, 1953, Serial No. 359,806

6 Claims. (Cl. 43—43.14)

This invention relates to improvements in fish line bobs or floats and has for its object to provide a device which is mountable on a fishing line slidably to receive the line therein. It is a further object of the invention to provide a device which is so constructed and arranged that a simple adjustment of the device will rigidly lock the line against such sliding movement.

It is common practice to provide a fish line float the interior of which may be filled, or partly filled with water or any other suitable substance to modify the buoyancy thereof. The float has in the wall thereof an aperture into which a stopper is mountable and it has been my experience that this stopper often becomes dislodged and is lost during fishing operations. It is in view of this a further object of the invention to lock the stopper securely in position while the float is in use by the same simple adjustment of the device which controls the position of the line therein.

These and other objects of the invention will be appreciated upon perusal of the following detailed description and by referring to the accompanying drawings of which:

Fig. 1 is a plan view of a device embodying the invention;

Fig. 2 is a side elevational view, partly in section, of the device of Fig. 1;

Fig. 3 is a fragmentary view on a larger scale of the middle portion of Fig. 1 and showing parts thereof in a different position of adjustment;

Fig. 4 is a cross sectional plan view more clearly disclosing important features of the device; and Figs. 5 and 6 are added to illustrate more clearly how the fish line and the stopper may be securely clamped in position.

The device illustrated in the drawings is composed of a preferably spherical buoyant member 1 having a recess 2 sunk half way into one side thereof into which the fishing line A may be inserted, as indicated in Fig. 1. The member is at the top and bottom thereof made with coaxially extending bosses 3, 4 which may be and preferably are exactly alike and it is noticed that the recess 2 extends through these bosses also. The bosses are preferably but not necessarily undercut, substantially as indicated at 5, 6, to provide annular seats for a locking element in the form of a spring wire 7. The ends of this element are shown bent to form loops 8, 9 which fit tightly into these seats when the element is bent about the spherical surface of the member into the position indicated in dotted outline at 16 in Fig. 1, whereupon it may be swung into the full outline position to maintain the line A confined within the recess 2. But it is important to note that the line is free to slide axially within the recess, as may be required in casting.

Upon further examination of the drawings, it is noticed that a notch 15 is cut into one side of the recess 2 and that this notch extends to the bottom of the seats 5, 6, substantially as shown in Fig. 3. When it is desired to lock the line against axial sliding movement within the recess 2, it is merely required again to swing the locking element 7 into the position indicated in dotted outline at 16, in Fig. 1, and to move the line A into this notch, whereupon the locking element is moved back into its former position tightly to lock the line against such sliding movement.

When the device is used in casting, it is often found necessary to alter the weight of the buoyant member 1. This member is for this purpose made hollow and it is preferably molded from clear, transparent plastic material. A passage 20 is cut through the wall of the member of a diameter to receive therein a plug 21. When it is required to alter the weight of the buoy, it is necessary to pull out this plug and to pour a sufficient amount of water into the buoy to produce the desired weight, whereupon the plug is pressed back into position and the device is ready for use as a bobber. But since it may be used in this manner over an extended period of time, there is danger that, in manipulating the device, the plug may become dislodged and lost. It is to eliminate all danger of such loss that the perforation 20 is placed in the position indicated in the drawings, diametrically opposite the recess 2. When so placed, it is seen that the locking element 7 comes to a stop directly in front of the plug when it is moved to confine the line A within the recess. And when the face of the plug is grooved to receive the element, as indicated at 22, it is seen that the plug is securely held locked in position.

It is seen from the foregoing description that I have provided a line buoy which possesses advantages not heretofore obtained so far as I have been able to ascertain. But while I have described and illustrated a preferred form of the invention it is to be understood that modifications within the scope of the claims hereto appended, may be embodied therein without departing from the spirit of the invention.

I claim:

1. A fish line buoy including a hollow body having bosses axially extending from the ends thereof, there being a recess in the side of the buoy extending to the axis thereof and of a size freely to receive the fish line therein, there being a notch in the side wall of the recess, the fish line being seatable in said notch, and a locking element riding on said bosses and extending along the outer surface of the body, the locking element being manually adjustable on the body to lock the line against sliding movement within the notch of the recess.

2. A fish line buoy including a hollow body having bosses axially extending from the ends thereof, the bosses having circular grooves at the bases thereof, there being a recess in the side of the buoy extending to the axis thereof and of a size freely to receive the fish line therein, there being a notch in the side wall of the recess, the fish line being seatable in said notch, and a locking element riding in the grooves of said bosses and extending along the outer surface of the body, the locking element being manually adjustable on the body to lock the line against sliding movement within the notch of the recess.

3. A fish line buoy including a hollow body having bosses axially extending from the ends thereof, there being a recess in the side of the buoy extending to the axis thereof and of a size freely to receive the fish line therein and an aperture in the side of the body diametrically opposite said recess, a stopper seatable in said aperture, and a locking element riding on said bosses and extending along the outer surface of the body, the locking element being manually adjustable on the body to lock the line for sliding movement within said recess and to lock the stopper tightly in the aperture.

4. A fish line buoy including a hollow body having bosses axially extending from the ends thereof, the bosses having circular grooves at the bases thereof, there being a recess in the side of the buoy extending to the axis thereof and of a size freely to receive the fish line therein, and an aperture in the side of the body diametrically opposite said recess, a stopper seatable in said aperture, and a locking element riding in the grooves of said bosses and extending along the outer surface of the body, the locking element being manually adjustable on the body to lock the line for sliding movement within said recess and to lock the stopper tightly in the aperture.

5. A fish line buoy including a hollow body having bosses axially extending from the ends thereof, there being a recess in the side of the buoy extending to the axis thereof and of a size freely to receive the fish line therein, and an aperture in the side of the body diametrically opposite said recess, a notched stopper seatable in said aperture, and a locking element riding on said bosses and extending along the outer surface of the body, the locking element being manually adjustable on the body to lock the line for sliding movement within said recess and to engage the notches of the stopper to lock the stopper tightly in the aperture.

6. A fish line buoy including a hollow body having bosses axially extending from the ends thereof, the bosses having circular grooves at the bases thereof, there being a recess in the side of the buoy extending to the axis thereof and of a size freely to receive the fish line therein, and an aperture in the side of the body diametrically opposite said recess, a notched stopper seatable in said aperture, and a locking element riding in the groove of said bosses and extending along the outer surface of the body, the locking element being manually adjustable on the body to lock the line for sliding movement within said recess and to engage the notches of the stopper to lock the stopper tightly in the aperture.

References Cited in the file of this patent

UNITED STATES PATENTS

| Number | Name | Date |
|---|---|---|
| 1,776,090 | Shroyer | Sept. 16, 1930 |
| 2,579,713 | Tolle | Dec. 25, 1951 |
| 2,587,311 | Golnick | Feb. 26, 1952 |
| 2,593,728 | Carpenter | Apr. 22, 1952 |
| 2,623,322 | Brown | Dec. 30, 1952 |

FOREIGN PATENTS

| Number | Country | Date |
|---|---|---|
| 256,404 | Germany | 1949 |
| 1,029,714 | France | 1953 |